United States Patent [19]

Oka et al.

[11] 4,010,055
[45] Mar. 1, 1977

[54] METHOD OF PRODUCING THREE-DIMENSIONALLY SHAPED INFLATABLE SAFETY BAG

[75] Inventors: Takashi Oka, Tokyo; Hiroshi Iwasaki, Kamakura; Eiichi Kato, Tokyo, all of Japan

[73] Assignees: Nissan Motor Co., Ltd.; Ikeda Bussan Co., Ltd.; Toray Industries, Inc., all of Japan

[22] Filed: June 6, 1975

[21] Appl. No.: 584,342

[52] U.S. Cl. .............................. 156/226; 156/290; 229/53

[51] Int. Cl.² .......................................... B31F 1/00

[58] Field of Search ................ 156/226, 227, 290; 229/53, 57, 60; 297/DIG. 3; 5/348 R, 348 WA

[56] References Cited

UNITED STATES PATENTS

| | | | |
|---|---|---|---|
| 3,282,411 | 11/1966 | Jardine | 229/57 X |
| 3,357,152 | 12/1967 | Geigel | 229/57 UX |
| 3,387,701 | 6/1968 | Schneider et al. | 229/53 X |
| 3,435,736 | 4/1969 | Reiche | 229/60 X |
| 3,485,439 | 12/1969 | Schrum | 229/53 X |
| 3,753,823 | 8/1973 | Kuss | 156/272 X |

*Primary Examiner*—David A. Simmons
*Attorney, Agent, or Firm*—Robert E. Burns; Emmanuel J. Lobato; Bruce L. Adams

[57] ABSTRACT

A sheet material is initially formed into a flat and quadrilateral bag, the four sides of which are sealed. Each of the front and back sheets of the flat bag is pinched up and folded in two parts at each corner region along a line running through a point placed at a selected distance from the corner such that two imaginary and symmetrical lines drawn on the inner surface of the sheet meeting at this point and terminating respectively at the two adjacent sides of the corner region are overlapped each other, and then a joint is formed in the folded region of the sheet along the overlapped lines.

14 Claims, 14 Drawing Figures

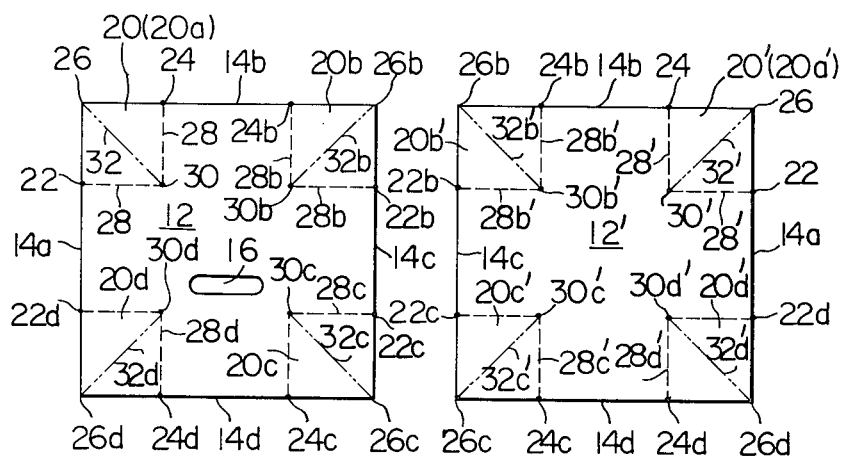
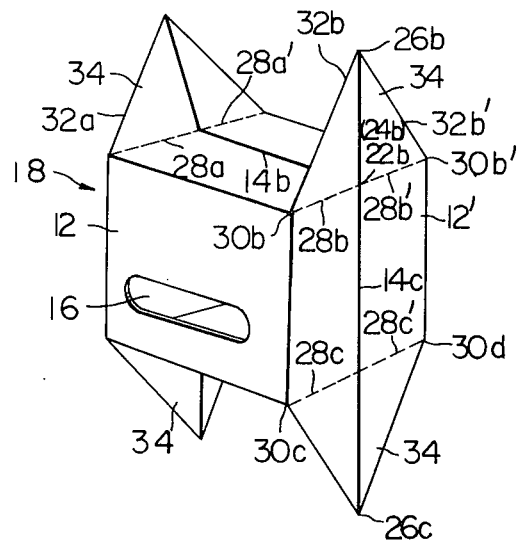

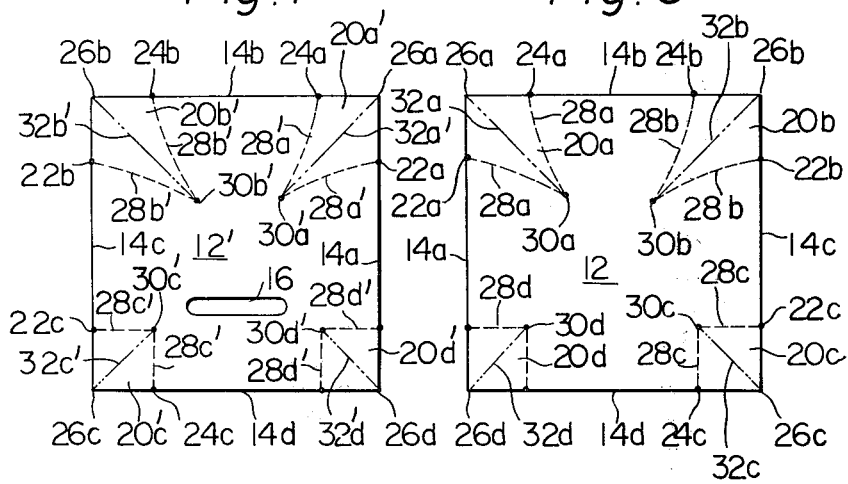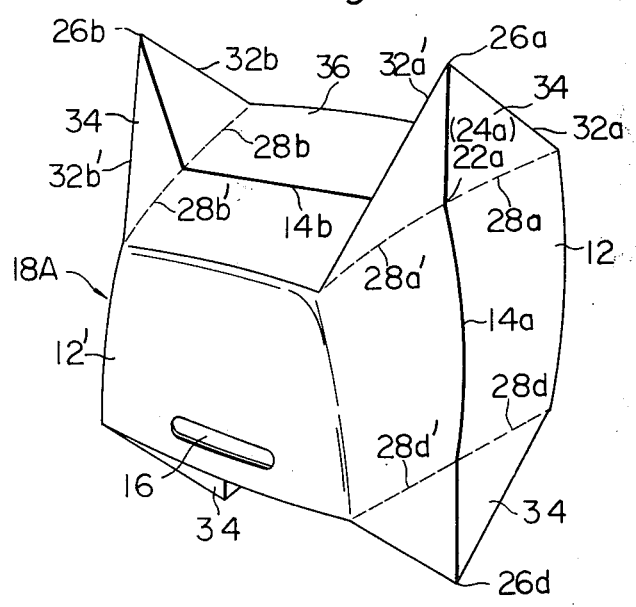

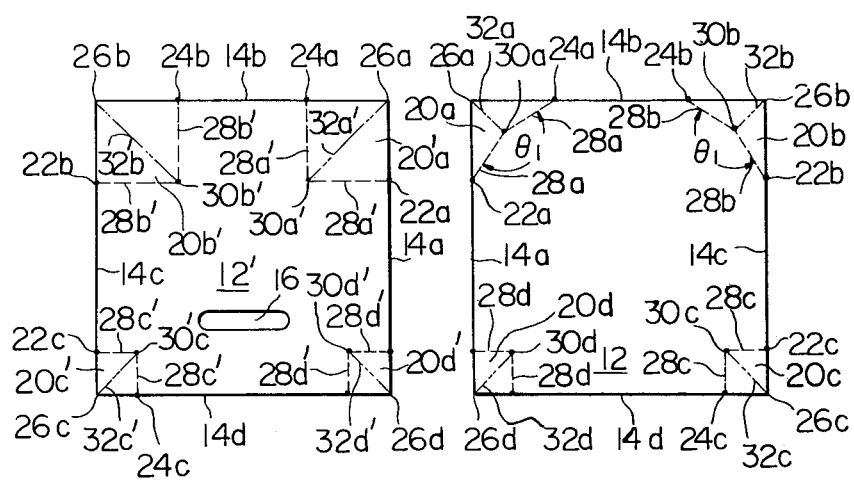

Fig. 12
Fig. 13
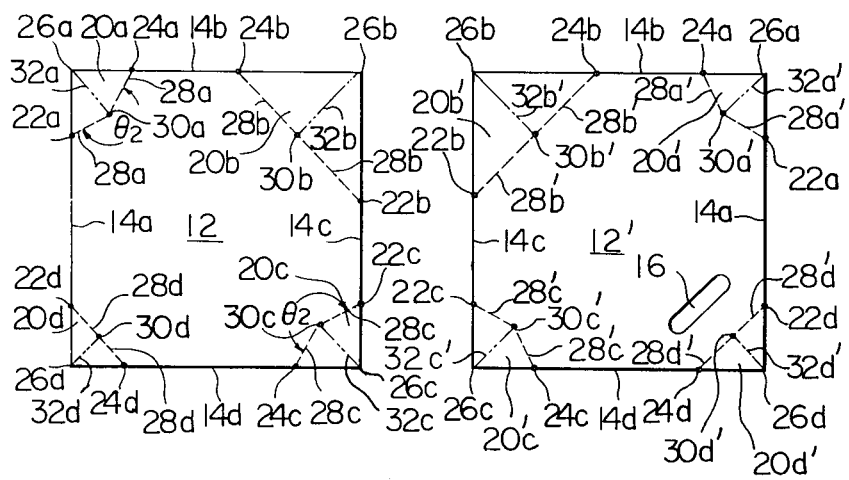
Fig. 14
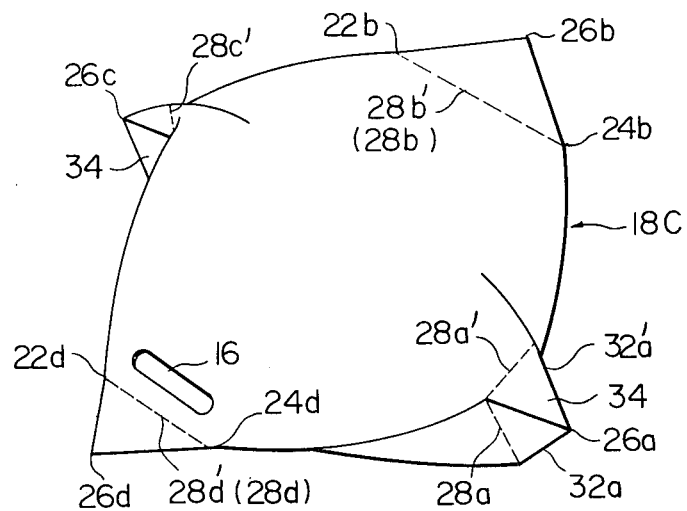

METHOD OF PRODUCING THREE-DIMENSIONALLY SHAPED INFLATABLE SAFETY BAG

BACKGROUND OF THE INVENTION

This invention relates to an improved method of producing an inflatable bag for the protection of a vehicle passenger in a collision of the vehicle.

It is expected that many rapid transit systems as typified by automobiles will be equipped with air bags or inflatable bags in the near future for protecting the passengers against injuries attributable to the so-called "second collision", in a collision of the vehicles. An inflatable bag for this use must have a particular threedimensional shape designed in compliance with the design of the passenger compartment and/or seat of the vehicle when fully inflated, and in many cases the shape is relatively complicated. Accordingly, the inflatable bag is conventionally produced by cutting out a plurality of differently shaped pieces from a sheet material and joining these pieces together by sewing, adhesive bonding or welding. The joining is performed in most cases along variously curved edges of the cut pieces, which are sometimes differently curved from each other. Naturally the work requires skill and long hours, and nevertheless the resulting joints are not always free from wrinkles and exhibit considerably great dispersions in the strength thereof, resulting in that the produced inflatable bag is not fully reliable. From the economical viewpoint, joining of long and variously curved edges inhibits the introduction of highly efficient machines, e.g. sewing machines of the two-needle type, and makes it inevitable to accomplish the work mainly by hand.

SUMMARY OF THE INVENTION

It is a general object of the present invention to provide an improved method of producing a three-dimensionally shaped inflatable safety bag, which method is free from the above disadvantages of conventional methods.

It is another object of the invention to provide an improved method of producing an inflatable bag which method can be carried out with ease and low costs and contributes to improvements on the uniformity of the quality of the products.

According to the invention, a three-dimensionally shaped inflatable bag is produced from a flexible and substantially gas impermeable sheet material, by a method which begins with forming a flat bag of the sheet material having the shape of a quadrilateral, all the four sides of which bag are sealed. Two imaginary lines are drawn on the inner surface of the front sheet of the flat bag in at least one corner region thereof symmetrically with respect to a third imaginary line drawn in the same plane, which two lines meet at a first point placed on the third line and out of every side of the bag and terminate respectively at one of the adjacent two dies of the corner region and at the other side. The method continues with folding the corner region in two parts along the third line so that the two imaginary lines are overlapped each other; forming a joint in the folded corner region of the sheet along the overlapped imaginary lines; and performing similar steps with respect to the back sheet of the flat bag in each of its corner regions opposite the folded corner regions of the front sheet. The two imaginary lines are advantageously curved.

The several imaginary lines and the fold line for each corner region may be drawn either identically with or differently from those for the other corner regions, and the fold line is preferably the bisector of the vertex angle of the corner.

BRIEF DESCRIPTION OF THE DRAWINGS

Other features and advantages of the invention will become apparent from the following detailed description of preferred embodiments thereof with reference to the accompanying drawings, in which:

FIG. 3 is a plan view of the bag of FIG. 1, diagramatically showing a first example of folding and joining patterns for transforming the same bag into a three-dimensional bag by a method according to the invention;

FIG. 4 is a back plan view of the same bag;

FIG. 5 is a perspective view of an inflatable bag produced by the employment of the pattern of FIGS. 3 and 4;

FIG. 6 is a plan view fundamentally the same as FIG. 3 but shows a and preferred second example of the folding and joining patterns;

FIG. 7 is a back plan view of the same bag;

FIG. 8 is a perspective view of an inflatable bag produced by the employment of the pattern of FIGS. 6 and 7;

FIGS. 9 and 10 are fundamentally the same view as FIGS. 3 and 4, respectively, but show a third example of the folding and joining patterns;

FIG. 11 is a perspective view of an inflatable bag produced by the employment of the pattern of FIGS. 9 and 10;

FIGS. 12 and 13 also are fundamentally the same views as FIGS. 3 and 4, respectively, but show a fourth example of the folding and joining patterns; and FIG. 14 is a perspective view of an inflatable bag produced by the employment of the pattern of FIGS. 12 and 13.

DESCRIPTION OF THE PREFERRED EMBODIMENTS

According to the present invention, an inflatable bag is produced by the use of any of the flexible and practically airtight or gas impermeable sheet materials which are good for conventional inflatable bags for the protection of vehicle passengers. Some examples of practical materials are woven or knitted fabrics, synthetic resin sheets, natural and artificial leathers and various combinations of them.

The sealing or joining operations according to of the invention are not necessarily limited to a particular method, but can be accomplished by any of known joining techniques such as sewing either by hand or with machine, knitting, adhesive bonding and welding, e.g., by means of a high frequency current, only if the choice is proper to the employed sheet material.

Figure 1:
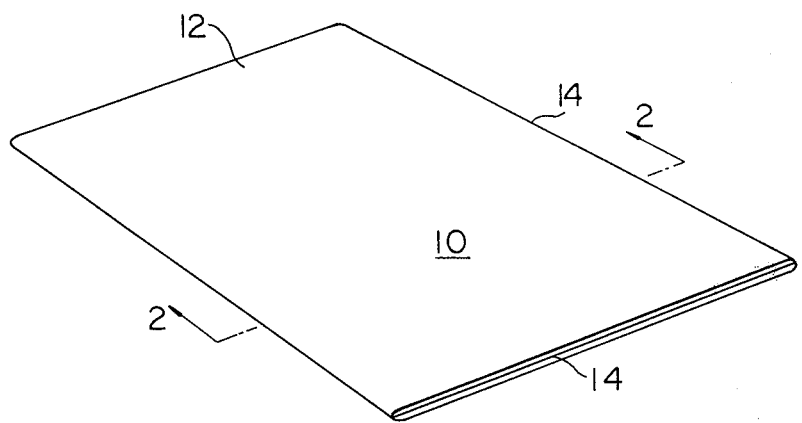
FIG. 1 is a perspective view of a flat and sealed bag diagramatically showing an example of the shapes of an intermediate product in a method of the invention.
Figure 2:
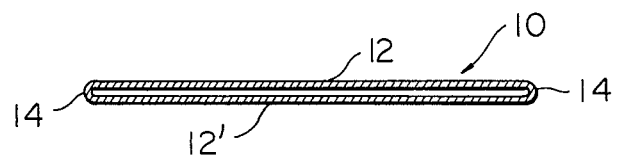
FIG. 2 is a cross sectional view taken along the line 2—2 of FIG. 1.

As a first step of a method according to the invention, a sheet material is shaped into a flat and rectangular bag 10 as diagramatically shown in FIGS. 1 and 2. This flat bag 10 may be best understood by imagining a large envelope having no flap and completely sealed up.

The flat bag 10 can be produced in various ways. For example, two similarly shaped rectangular sheets 12 and 12' are put one upon another and joined with each other by sealing all the four edges 14 of the rectangle airtight. Alternatively, the sheet material is preliminarily formed into the shape of an open tube, then flattened into a rectangular shape and finally sealed along both the edges corresponding to the original open ends. It is preferred to utilize a seamless tube which is formed by either weaving or knitting since the resulting flat bag 10 has no seam or joint along a pair of parallel sides and exhibits a higher and more uniform strength than the other type of bag produced by sealing up four edges of rectangularly cut two sheets 12 and 12'. The sheet material may be coated with rubber or resin for the enhancement of gas impermeability, either before or after the shaping and flattening. The flat bag 10 can be formed also by initially forming a hollow and thin-walled container of a synthetic resin by means of any usual technique and thereafter crushing the container and expelling the air confined therein.

An inflatable bag for present purposes is usually required to have a volume ranging from about 70 to about 250 liters in the inflated state. Accordingly the dimensions of the flat bag 10 are determined to give the required volume when the bag is transformed into a three-dimensional shape by the steps hereinafter described.

The flat bag 10 of FIG. 1 has the shape of a rectangle, but the illustrated shape is only by way of example. The shape can be chosen out of all the types of quadrilaterals, namely, square, parallelogram, lozenge, trapezoid and irregular quadrilaterals in compliance with the intended shape of an end product, i.e., a three-dimensionally shaped inflatable bag.

The thus formed flat and four-sided bag 10 is transformed into an inflatable bag 18, which is a hollow solid in the inflated shape as shown in FIG. 5, by the following procedures.

Referring to FIG. 3, an opening 16 is preliminarily formed in the skin of the bag 10, i.e., either the front or the back sheet 12 or 12', at a suitable location so as to serve as a gas inlet port for the inflation of the inflatable bag 18. Alternatively, the opening 16 may be made in the sheet material before shaping it into the flat bag 10.

Then the front and back sheets 12 and 12' are respectively pinched and pulled outward in at least one corner region 20 and 20', and the corner region 20 and 20' are folded in two parts, respectively, putting a point 22 on one side 14a of the rectangle on another point 24 which is on another side 14b meeting the former side 14a at the vertex 26 of this corner region 20 or 20'. Next, a joint is formed in the folded corner region 20 along a joint line 28 connecting the point 22 (which is now the point 24 at the same time) and another point 30 which is on neither the side 14a nor the side 14b but in a line 32 along which the corner region 20 is folded. Similar procedures may be performed for the remaining three corner regions 20 of the front sheet 12 and also for all the corner regions 20' of the back sheet 12'.

The three points 22, 24 and 30 may be determined at various distances from the vertex 26 depending on the intended shape and dimensions of the inflatable bag 18, and the joint lines 28, in different corner regions, are either a straight line or curved as will be described hereinafter. In practice, the locations of the three points 22, 24 and 30 and the type of the joint line 28 are determined prior to the step of folding each sheet 12 or 12' at each corner region 20 or 20'. It is convenient to fold each corner region 20 or 20' along the bisector of the angle at each vertex 26 for simplifying the folding and joining operations and obtaining an end product of good appearance.

It will be understood that the above steps of folding the corner regions 20 and 20' and forming a joint in each folded region along the line 28 result in transforming the flat bag 10 into a three-dimensionally shaped hollow solid or bag 18, but the following examples will be of help to a better and more practical comprehension of the essential procedures in a method of the invention.

EXAMPLE 1

FIGS. 3 and 4 generally illustrate a first example of the folding and joining patterns with respect to the flat bag 10 having a rectangular shape. In this example all of four corner regions 20a, 20b, 20c and 20d of the front sheet 12 and four corner regions 20'a, 20'b, 20'c and 20'd of the back sheet 12' are subjected to the folding and joining procedures, respectively, in just the same manner. With respect to the corner region 20b by way of example, a point 30b is placed in the bisector 32b of the right angle of the vertex 26b between the upper side 14b and right side 14c of the rectangular bag 10, and two symmetrical straight lines 28b are drawn imaginarily on the inner surface of the front sheet 12 to meet perpendicularly at the point 30b and respectively intersect the right side 14c and the upper side 14b. Naturally a square is constructed with the points 24b, 26b, 22c and 30b as its four vertexes. Then the same procedures are accomplished with respect to the corner region 20b' of the back sheet 12' which is just opposite the above-described corner region 20b of the front sheet 12. Next, the corner region 20b is folded in two parts along the bisector 32b, so that the point 24b is put on the point 22b and the two imaginary lines 28b are overlapped each other. Similarly, the imaginary lines 28b' on the back sheet 12' are overlapped each other. Finally a linear joint is formed in the folded corner region 20b of the front sheet 12 along the overlapped lines 28b, and the same thing is done for the corner region 20b' of the back sheet 12', forming another joint along the overlapped lines 28b'.

When these procedures are accomplished for all the corner regions 20 and 20' of the flat bag 10, the flat bag 10 is naturally transformed into a hollow hexahedron having triangular flaps 34 as seen in FIG. 5. It will be understood from the comparison of FIG. 5 with FIGS. 3 and 4 that the joint or the overlapped lines 28b on the front sheet 12 and the other joint 28b' on the back sheet 12' will be in a straight line and will turn into one of the sides of the hexahedron, which is the shape of the inflatable bag 18 produced in this example in the inflated state. This inflatable bag 18 is simple in shape, easy to produce and of practical use for passenger compartments in certain vehicles. If desired, each triangular flap 34 may be folded along the joints 28–28' and fixed onto one of the faces of the hexahedron bag 18. Alternatively, the bag 18 may be turned inside out by the aid of the opening 16 so that the flaps 34 may be put away in the bag 18.

EXAMPLE 2

Referring to FIGS. 6 and 7, the flat bag 10 in this example also has the shape of a rectangle. For both the front and back sheets 12 and 12' of this bag 10, two of the corner regions 20c and 20d (and 20c', 20d') are folded and sealed in the same manner as in Example 1. The joint lines 28c and 28d (and 28c', 28d') are straight ones making a right angle at each meeting point, e.g., 30c. For each of the remaining two corner regions 20a and 20b (or 20a', 20b') of each sheet 12 or 12' which have the upper side 14b of the bag 10 as one of their sides in common, the two imaginary lines, e.g., 28a are drawn on a different pattern. The point 30a at which the two lines 28a meet is contained in the bisector 32a of the right angle of the vertex 26a of this corner region 20a similarly to the meeting points 30c and 30d in the square shaped corner regions 20c and 20d, although the distance from the vertex 26 may be different. The two lines 28a and 28b, however, are not straight but curved in these two corner regions 20a and 20b. Nevertheless, the two curves, e.g., 28a are symmetrical with respect to the bisector 32a, so that the terminal points 22a and 24a respectively on the left and upper sides 14a and 14b are at the same distance from the vertex 26a. All the corner regions 20a, 20c, etc. of this flat bag 10 are folded according to the procedure of Example 1, and joints are formed in the same manner along the overlapped imaginary lines 28a, 28c etc.

As a result, the flat bag 10 is transformed into a three-dimensionally shaped bag 18A as shown in FIG. 8. This bag 18A also is generally hexahedron in shape, but has a curved face 36 between the curved edges, i.e., the joints formed along the imaginary lines 28a–28a' and 28b–28b'. In this instance, the curved lines 28a, 28b, etc. are drawn in compliance with the curvature of a windshield of a vehicle so that the curved face 36 of the bag 18A will fit the windshield when the bag 18A is inflated in the vehicle. Thus, this inflatable bag 18A is particularly suitable for use in the front seat of the vehicle. Although curved joints typified by 28a are formed in this example, there is no need for any particular skill for the accomplishment of the joining work since the curved joints are formed in a plane.

EXAMPLE 3

In FIGS. 9 and 10, the flat bag 10 has the shape of a rectangle, and the corner regions 20c and 20d of the front sheet 12 and 20c', 20d' of the back sheet 12' located along the lower side 14d of the bag 10 have the imaginary lines 28c, 28d, 28c' and 28d', respectively, on the same pattern as that in Example 1. For the back sheet 12', the imaginary lines 28a' and 28b' in the remaining two corner regions 20a' and 20b' also are drawn on the same pattern except that they are longer than the aforementioned lines 28c' and 28d'. In the remaining two corner regions 20a and 20b of the front sheet 12 which are located along the upper side 14b of the bag 10, however, the points 30a and 30b are placed respectively in the bisectors 32a and 32b at a shorter distance from the vertexes 26a and 26b than the points 32a' and 32b' on the back sheet 12'. Both the imaginary lines 28a and 28b in these corner regions 20a and 20b are drawn straight to terminate at the points 22 and 24 which are at the same time the terminals of the lines 28a' and 28b' in the opposite regions 20a' and 20b' of the back sheet 12'. Consequently, the two lines 28a meet at the point 30a making an obtuse angle $\theta_1$ therebetween unlike the right angle between the lines 28a' in the opposite region 20a'. Thus, the corner region 20a defined by these lines 28a is concaved at the point 30a.

The folding and joining work are carried out in the same manners as in Example 1, and the flat bag 10 is transformed into a three-dimensional inflatable bag 18B as shown in FIG. 11. In this bag 18B, the joint along the overlapped lines 28a in the front sheet 12 and the lines 28a' in the back sheet 12' do not come in a straight line but make an angle at the overlapped points 22a, 24a. Accordingly, this bag 18B is generally hexahedron in shape but has a bent or broken face 38 between the joints 28a–28a' and 28b–28b', which face 38 consists of two planes meeting at an angle along the upper edge 14b of the flat bag 10. The angle between these two planes is designed such that the bag 18B is inflated along a slant member in a vehicle.

EXAMPLE 4

The flat bag 10 in FIGS. 12 and 13 also is rectangular in shape. In the corner region 20a of the front sheet 12 and another corner region 20c diagonal of the former, the imaginary joint lines 28a and 28c meet respectively at the points 30a and 30c, which are respectively in the bisectors 32a and 32c of the respective angles of the vertexes 26a and 26c, making an obtuse angle $\theta_2$ therebetween, so that each corner region defined by the imaginary lines 28a or 28c is convex at this point 30a or 30c. The terminal points 22a and 24a respectively on the sides 14a and 14b are at the same distance from the vertex 26a, e.g. for the corner region 20a. In the remaining and diagonal corner regions 20b and 20d of the front sheet 12, the imaginary lines 28b and 28d meet respectively at the points 30b and 30d making no angle therebetween. In other words, the two joint lines 28b or 28d turn into a single straight line perpendicular to the bisector 32b or 32d. The lines 28b in the corner region 20b are different in length from the lines 28d in the diagonal corner region 20d.

For the back sheet 12', the imaginary lines 28' are drawn on the same patterns as the lines 28 in the opposite corner regions 20 of the front sheet 12. Thereafter, only the corner regions 20a, 20c, 20a' and 20c' are subjected to the folding and joining procedures as described in the previous Examples. The remaining corner regions 20b, 20d, 20b' and 20d' are left unfolded in this Example. The front sheet 12 and the back sheet 12' are joined with each other in these corner unfolded regions along the lines 28b (and 28b') and 28d (and 28d'), respectively. As a result, the flat bag 10 is transformed into a three-dimensionally shaped safety bag 18C as shown in FIG. 14.

This bag 18C is characterized by its curved surface as a whole and is particularly suitable for use in the driver's seat of a vehicle. It will be understood that the joint lines 28b (and 28b') and 28d (and 28d') are not necessarily straight lines as illustrated but may alternatively be variously curved lines. Besides, these joint lines 28b, 28d are not necessarily bisected at the point 30.

The above illustrated patterns of the imaginary lines 28 and 28' for the joining work may be employed in various combinations thereof depending on the intended shape of the inflatable bag 18. Every corner region 20 and 20' of the flat bag 10 are subjected to the folding and joining procedures throughout the above examples except for two regions in Example 4, but one or a plurality of the corner regions 20 and 20' may be left neither folded nor joined if such is suitable for obtaining the intended bag shape.

The first advantage of the method according to the invention resides in the simplicity of the joining work. Regardless of the patterns of the joints, the joining work can be accomplished merely forming linear joints in the overlapped two parts or pieces of sheets. The joining work is extremely easy to perform compared with joining work in conventional methods wherein the joints are formed along curves not lying in a single plane. Accordingly, the method of the invention does not require skilled workers and enables highly efficient or automatic machines to be used into the production of variously shaped inflatable bags. Besides, cutting and marking work for the starting sheet materials can be done very easily and efficiently.

Secondly, the method of the invention gives inflatable bags of improved quality. Every joint formed by this method is utterly free from wrinkles and exhibits a strength exactly as intended with an extremely small extent of dispersion. Furthermore, the inflatable bag produced according to the invention can be folded in and fully inflated quite smoothly and rapidly.

What is claimed is:

1. A method of producing a three-dimensionally shaped inflatable bag for the protection of a vehicle passenger in collision of the vehicle, the method comprising the steps of:
   a. making a flat quadrilateral bag of a flexible and substantially gas impermeable sheet material so as to provide the bag with a flat front sheet, a flat back sheet, and four sides surrounding said sheets, the front sheet having, in a corner region thereof, two curved joint lines imaginarily drawn respectively to intersect two of the four sides which define said corner region and to meet at a point on an imaginary and straight third line drawn obliquely to said two sides to divide said corner region into two portions thereof, said two curved lines being symmetrical with respect to said third line;
   b. sealing the flat bag;
   c. folding the two portions of said corner region along said third imaginary line so that said two curved lines overlap each other;
   d. making a joint in the folded corner region along the overlapped curved joint lines;
   e. similarly folding a corner region and making a joint in the back sheet of said flat bag in a corner region thereof opposite said corner region of the front sheet; and
   thereby producing a three-dimensionally shaped inflatable bag which fits into a vehicle.

2. A method as claimed in claim 1, wherein said imaginary and straight third line bisects a vertex angle of said corner region.

3. A method as claimed in claim 1, wherein two lines are drawn imaginarily on a surface of said back sheet in a form identical to that of the curved joint lines.

4. A method as claimed in claim 1, including the step of drawing two imaginary lines in a corner region of one of said front and back sheets in a form different from the form of the two imaginarily drawn lines, to promote the folding of the corresponding corner regions and the corresponding producing of a shaped bag.

5. A method as claimed in claim 1, including the step of drawing two imaginary lines identically to the two imaginarily drawn lines, in an additional corner region of said front sheet and an opposite corner region of said back sheet, to promote the folding of the corresponding corner regions.

6. A method as claimed in claim 1, wherein said two lines drawn imaginarily in one corner region of said front sheet are drawn differently from two lines in the opposite corner region of said back sheet, to promote the folding of the corresponding corner regions.

7. A method as claimed in claim 2, wherein the forming of the flat bag is performed so that the flat bag has the shape of a rectangle.

8. A method according to claim 2 wherein the forming of the flat quadrilateral bag is performed so as to provide each sheet with a plurality of, but less than four, additional regions generally similar to said corner region, at least one of the additional regions having two straight lines imaginarily drawn respectively to intersect two of the four sides which define the respective additional region, and to meet at a point on an imaginary and straight third line bisecting a vertex angle of the respective region, the method including; folding each additional region, similarly to the folding of the front sheet's corner region; and making a joint in each folded additional region, similarly to the making of the joint in the front sheet's corner region.

9. A method according to claim 8, wherein the flat bag has a rectangular shape, each set of two straight lines meeting at a corresponding point on said third line to make an angle.

10. A method according to claim 9, wherein said angle is a right angle.

11. A method according to claim 10, in which two additional sets of lines are identically drawn, each set having two straight joint lines, one set being drawn in each of two of the additional regions, to define the folding of the two additional regions.

12. A method of producing a three-dimensionally shaped inflatable bag, for the protection of a vehicle passenger in collision of the vehicle, comprising;
   a. making a flat rectangular bag of a flexible and substantially gas impervious sheet material so as to provide the bag with a flat rectangular front sheet, a flat rectangular back sheet, and four sides surrounding said sheets, the front sheet having in a corner region thereof two curved joint lines imaginarily drawn respectively to intersect two of the four sides, which define said region, and to meet at a point on an imaginary and straight third line drawn obliquely to said two sides, to divide said corner region into two portions thereof, the two curved lines being symmetrical with respect to the third line, each of the two rectangular sheets having, in each additional corner region, two straight joint lines imaginarily drawn respectively to intersect those of the sides which define the respective corner region, and to meet at a right angle;
   b. sealing the flat bag;
   c. folding each corner region so that the respective joint lines overlap each other; and
   d. making a joint in each folded corner region along the overlapped joint lines, to produce a three-dimensionally shaped inflatable bag which fits into a vehicle.

13. A method of producing a three-dimensionally shaped inflatable bag for the protection of a vehicle passenger in collision of the vehicle, the method comprising the steps of:
   a. making a flat bag of a flexible and substantially gas impermeable sheet material, in a shape having four sides, the four sides being sealed;
   b. drawing imaginarily two curved lines on an inner surface of a front sheet of the flat bag in a corner region thereof to respectively intersect two sides of the flat bag defining said corner region and to meet at a point on an imaginary and straight third line drawn obliquely to said two sides on the same surface to divide said corner region into two regions, the two curved lines being symmetrical with respect to the third line;

c. folding said corner region in two parts along the third imaginary line so that the two curved lines overlap each other;

d. making a joint in the folded corner region along the overlapped curved lines;

e. drawing imaginarily two straight lines on an inner surface of a back sheet of the flat bag in a back sheet corner region thereof opposite said corner region of the front sheet to respectively intersect two sides of the flat back sheet and to meet at a point on an imaginary and straight fourth line drawn obliquely to said two sides on the inner surface of the back sheet to divide the back sheet corner region into two regions, said two straight lines being symmetrical with respect to said fourth line;

f. folding the latter corner region in two parts along said fourth line so that said two straight lines overlap each other; and g. making a joint in the folded back sheet corner region along the overlapped straight lines.

14. A method of producing a three-dimensionally shaped inflatable bag for the protection of a vehicle passenger in collision of the vehicle from a flexible and substantially gas impermeable sheet material, the method comprising the steps of:

a. making a flat and rectangular bag of the sheet material, having a front sheet and a back sheet and having four corner regions, the front sheet having two curved joint lines imaginarily drawn in a first of the corner regions to intersect two sides of the rectangular bag defining said corner region and to meet at a point on an imaginary and straight third line drawn obliquely to said two sides to divide said first corner region into two portions, said two curved lines being symmetrical with respect to said third line;

b. sealing the four sides of the rectangular bag;

c. folding the two portions along the third line to overlap the curved joint lines;

d. making a joint in the folded corner region along the overlapped joint lines;

e. performing steps corresponding to (c) and (d), with respect to a second corner region of the front sheet of the flat, rectangular bag located diagonally across the first corner region, and with respect to two corner regions of the back sheet of the flat, rectangular bag located respectively opposite the first and second corner regions with curved joint lines in a corner region of the back sheet identically to the curved joint lines of the front sheet; and f. joining the front and back sheets along a fourth line which connects a point on a side of the flat bag with another point on an adjacent side with respect to the remaining two corner regions of the flat bag.

* * * * *